United States Patent
Schmitt et al.

(10) Patent No.: US 10,733,145 B1
(45) Date of Patent: Aug. 4, 2020

(54) TECHNIQUES FOR DISTRIBUTING VERIFICATION CHECKS INCIDENT TO DATA DELETION

(71) Applicant: Amazon Technologies, Inc., Seattle, WA (US)

(72) Inventors: Ryan Charles Schmitt, Seattle, WA (US); Claire Elizabeth Suver, Seattle, WA (US); Mark Christopher Seigle, Seattle, WA (US); Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 634 days.

(21) Appl. No.: 14/572,603

(22) Filed: Dec. 16, 2014

(51) Int. Cl.
*G06F 16/16* (2019.01)
*G06F 11/10* (2006.01)

(52) U.S. Cl.
CPC ........ *G06F 16/162* (2019.01); *G06F 11/1076* (2013.01)

(58) Field of Classification Search
CPC ........... G06F 17/30117; G06F 11/1076; G06F 16/162
See application file for complete search history.

(56) References Cited

U.S. PATENT DOCUMENTS

| | | | |
|---|---|---|---|
| 6,957,221 B1 * | 10/2005 | Hart | G06F 11/2097 |
| 7,103,619 B1 * | 9/2006 | Rajpurkar | G06F 16/273 |
| 7,200,626 B1 * | 4/2007 | Hoang | G06F 11/0751 |
| 9,390,109 B2 * | 7/2016 | Pawar | G06F 11/1474 |
| 2009/0150462 A1 * | 6/2009 | McClanahan | G06F 17/30197 |
| 2012/0297191 A1 * | 11/2012 | Johnson | H04L 9/3236 |
| | | | 713/168 |
| 2014/0137252 A1 * | 5/2014 | Zheng | G06F 21/56 |
| | | | 726/24 |
| 2015/0134619 A1 * | 5/2015 | Factor | G06F 16/125 |
| | | | 707/663 |
| 2015/0363469 A1 * | 12/2015 | Peloski | G06F 17/30516 |
| | | | 707/741 |

* cited by examiner

*Primary Examiner* — Huawen A Peng
(74) *Attorney, Agent, or Firm* — David Wright Tremaine LLP

(57) ABSTRACT

Techniques described and suggested herein include distributed deletion request processing and verification. For example, incident to migration of original data from a first data store to a second data store, verifications and confirmations related to removing the original data from the first data store may be performed so as to ensure the integrity of the original data represented on the second data store prior to removing the actual original data on the first data store. In some embodiments, the verifications and confirmations performed in connection with a deletion request may be apportioned to multiple entities, each of which may not fully trust the others. As a result, in some embodiments, a given deletion request may only be fulfilled if all of the entities involved in the verification process individually provide authorization to execute the deletion request.

20 Claims, 7 Drawing Sheets

US 10,733,145 B1

TECHNIQUES FOR DISTRIBUTING VERIFICATION CHECKS INCIDENT TO DATA DELETION

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider as need and depending on their needs.

As the demand for network-based storage services such as archival storage services grows, however, implementing systems increasingly necessitate the migration of data from one subsystem to another to accommodate the increasing demand, to most efficiently service storage requests, and decrease the cost of storing data. In many instances, migration requires not only a copy of data from a source data store to a target data store, but also a deletion of the data from the first data store. As the asynchronicity of distributed storage systems increases, execution of deletion of the data from the first data store prior to verifiably copying the data to the second data store is becoming increasingly problematic.

BRIEF DESCRIPTION OF THE DRAWINGS

Various embodiments in accordance with the present disclosure will be described with reference to the drawings, in which.

DETAILED DESCRIPTION

Figure 1:
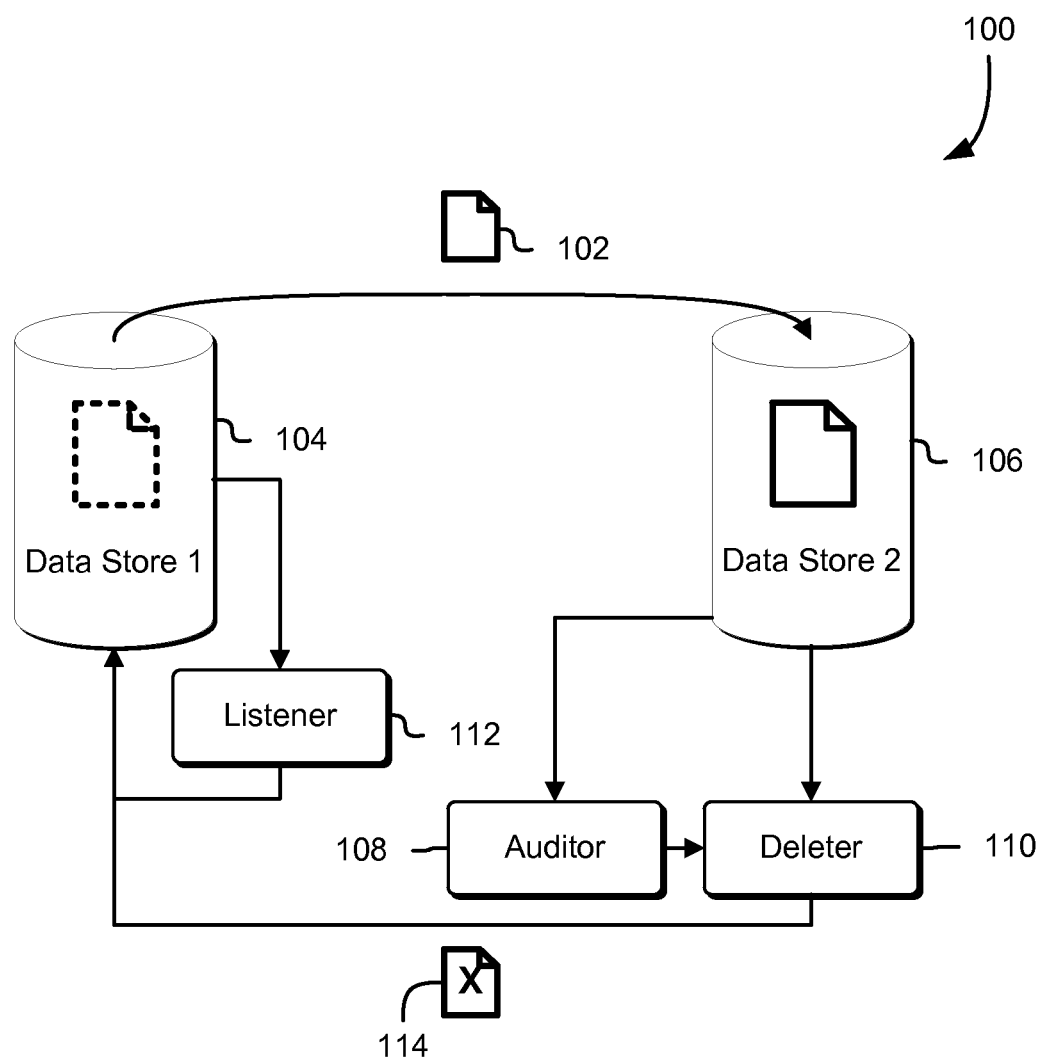
FIG. 1 schematically illustrates an example environment and various workflows for distributing data and process verification incident to deletion of original data, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include distributed deletion request processing and verification. For example, incident to migration of original data from a first data store to a second data store, verifications and confirmations related to removing the original data from the first data store may be performed so as to ensure the integrity of the original data represented on the second data store prior to removing the actual original data on the first data store. In some embodiments, the verifications and confirmations performed in connection with a deletion request may be apportioned to multiple entities, each of which may not fully trust the others. As a result, in some embodiments, a given deletion request may only be fulfilled if all of the entities involved in the verification process individually provide authorization to execute the deletion request.

In some embodiments, a second data store that is responsible for storing a data set representing original data received from (and temporarily stored on) a first data store initiates a deletion workflow, such as by submitting a deletion request, to remove the original data from the first data store after having stored the associated data set. At the outset of the deletion workflow, the deletion request may first be processed by an auditor, so as to perform various verification checks on the data set associated with the original data requested to be deleted. The verification checks may include verifying the data set against the original data, whether the data set was encoded properly (e.g., using a redundancy code), whether metadata associated with the data set is the same as or complimentary to metadata associated with the original data, and the like.

After successfully performing the verification checks, the auditor may approve the deletion request and place it in a queue for further processing by a deleter. The deleter may first determine whether the auditor performed the requisite verification checks required by the implementing system as a prerequisite for approving a given deletion request, as well as assess the outcome of the verification checks performed by the auditor. Once these requirements are met, the deleter may further approve and issue the deletion request to the first data store (e.g., the data store presently holding the original data) to be processed.

A listener may be implemented to monitor action requests inbound to the first data store for incoming deletion requests, and may perform further processing on the deletion requests. The listener may ascertain, as a final check, several aspects of the incoming deletion request prior to approving it for final execution. For example, the listener may compare the origin of the deletion request, and in some embodiments, a manifest of the verification checks and other actions performed in connection with the deletion request, against a database or list of authorized issuers, actions, and the like, which may be chosen as a result of one or more policies implemented by the system. If the listener determines that the deletion request is valid according to these policies, the listener may provide a final approval for the deletion request, and thereon mark or submit the approved deletion request for final disposition, e.g., by causing the first data store to delete the original data at issue in the deletion request.

FIG. 1 schematically illustrates an example environment and various workflows for distributing data and process verification incident to deletion of original data, in accordance with some embodiments. Original data 102 is migrated from a first data store 104 to a second data store 106. The original data 102 may be any quantity, unit, collection, or abstraction of data. For example, the original data 102 may be a block object, a file, a file system, a volume, a range of physical offsets, and the like. For example, the original data 102 may be a data container, such as a volume, containing multiple data objects (e.g., data bundles to be archived), each of which may contain one or more files. The migration may be initiated by any process or action, whether manual or automatic. For example, the migration may be performed as the result of a request of, e.g., a customer of an implementing computing resource provider, that provides the original data to the implementing system (e.g., including at least the first and second data stores) via a user interface or programmatic interface, such as an application programming interface call or a web service call. In the case that a customer-facing interface is provided, such as a user interface or an application programming interface, such interface may be provided by any component of the implementing system, such as the first data store 104, the second data store 106, or a resource or collection of resources of an implementing computing resource service provider.

The data stores 104, 106 may be any computing resource or collection of such resources capable of processing data for storage, and either storing and/or interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those connecting to the data stores 104, 106 via application programming interface calls, web service calls, or other programmatic methods), and the like.

In some embodiments, the data stores 104, 106 may combine various types of such resources, such as a storage server connected to a plurality of storage devices. In some embodiments, the resources of the data stores 104, 106 may be one or more resources of a computing resource service provider, such as that described in further detail below. In some embodiments, the data stores 104, 106 and/or the computing resource service provider provides one or more archival storage services and/or data storage services, such as those described in further below, through which the customers may transact data such as data in connection with data storage requests (e.g., to store original data) received from the customers.

In some embodiments, incident to migration of the original data 102 from the first data store 104 to the second data store 106, one or more verifications and confirmations may be performed in connection with a deletion request for original data from the first data store, so as to ensure the integrity of the original data 102 represented on the second data store 106 prior to removing the actual original data 102 on the first data store 104. In some embodiments, the verifications and confirmations performed in connection with a deletion request may be apportioned to multiple entities, such as an auditor 108, a deleter 110, and/or a listener 112, each of which may not fully trust any of the other entities. As a result, in some embodiments, a given deletion request may only be fulfilled if all (or at least a predetermined quorum) of the entities involved in the verification process individually provide authorization to execute the deletion request.

In some embodiments, the second data store 106 responsible for storing a data set representing the original data 102 received from (and temporarily stored on) the first data store 102 initiates a deletion workflow, such as by submitting a deletion request to an auditor 108, to remove the original data 102 from the first data store 104 after having stored the associated data set. At the outset of the deletion workflow, the auditor 108 may perform various verification checks on the data set associated with the original data 102 requested to be deleted.

The auditor 108 may be any resource or collection of computing resources, such as that of a computing resource service provider, that is/are capable of processing data and communicating with other computing entities, such as the second data store 106. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data stores 104, 106 via application programming interface calls, web service calls, or other programmatic methods), and the like. In some embodiments, the auditor 108 may be implemented on one or more processes, daemons, and/or execution threads running on the resource or collection of computing resources.

The verification checks may be varied in quantity and in nature, and may be performed directly by the auditor 108, and/or, in some embodiments, may be initiated by the auditor 108 so as to be performed by a different entity, such as a component of the second data store 106. The verification checks may include verifying the data set stored on the second data store 106 against the original data 102 (as stored on the first data store 104), and/or whether the data set was even stored on the second data store 106 at all. In some embodiments, the data set may include a plurality of encoded shards that were derived, e.g., by the second data store 106 as part of the migration or storage process, by applying a redundancy code (e.g., erasure code) to the original data 102. In such embodiments, as discussed in further detail herein, the shards in the data set may be used to reconstruct information from the data set, such as by inverting the previously applied redundancy coding matrix, or by generating a checksum or applying a hash function thereto. Further, in such embodiments, verification of the stored data set may be executed by comparing the reconstructed information with analogous information related to the original data 102 as stored on the first data store 104. For example, the reconstructed information may be directly compared to the original data 102 so as to ascertain that they are the same. As another example, the reconstructed information may be compared to a function or value associated with the original data 102, such as a hash value or a checksum, so as to ascertain that they match.

Other verification checks are contemplated hereby, and may include verification of whether metadata associated with the data set stored on the second data store 106 is the same as or complimentary to analogous metadata associated with the original data as stored on the first data store. For example, in embodiments where the data set stored on the second data store 106 is sharded, the shards in the data set may be checked against one another for metadata consistency, and once the metadata consistency is confirmed across the shards, the metadata is checked against analogous metadata reported by, or connected to, the original data 104 stored on the first data store 104.

In some embodiments where the data set includes redundancy coded shards derived from the original data 102, a verification check that may be executed is to calculate the number of shards in the data set stored on the second data store 106, and compare that quantity relative to a predetermined value that may, for example, be selected from a policy implemented by the implementing system, the second data store 106, the auditor 108, or another entity associated with the computing resource service provider. For example, the data set may be generated such that n shards are expected to be stored, but the auditor may consider the data set properly stored on the second data store 106 if n-x shards actually exist in the stored data set, where n-x may be the predetermined value.

After successfully performing the verification checks, the auditor 108 may approve the deletion request and place it in a queue for further processing by a deleter 110. The deleter 110 may be any resource or collection of computing resources, such as that of a computing resource service provider, that is/are capable of processing data and communicating with other computing entities, such as the second data store 106 and auditor 108. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data stores 104, 106 via application programming interface calls, web service calls, or other programmatic methods), and the like. In some embodiments, the deleter 110 may be implemented on one or more processes, daemons, and/or execution threads running on the resource or collection of computing resources.

The deleter 110 may first determine whether the auditor 108 performed at least a predetermined set of verification checks required by the implementing system as a prerequisite for approving a given deletion request, as well as assess the outcome of at least that predetermined set of verification checks as performed by the auditor 108. For example, the deleter 110 may require a first set of verification checks to have been completed, while the auditor 108 may have performed a second set of verification checks. To the extent that the first set of verification checks is coincident with, or a subset of, the second set of verification checks, and those checks the deleter 110 requires had successful outcomes (as determined by the auditor 108), the deleter 110 may further issue the deletion request for the associated original data to the first data store 104.

In some embodiments, the deleter 110 may assess the raw data generated by the verification checks performed or initiated by the auditor 108, and come to verification conclusions that are determined independently of the auditor's 108 assessment of the same raw data. In such a case, as may be contemplated, the verification checks performed must have provided results that fulfill the independent requirements of both the auditor 108 and the deleter 110 in order for an associated deletion request to be passed on to the first data store 104 for further disposition.

Once the requirements are met, the deleter 110 may further approve and issue the deletion request to the first data store 104 (e.g., the data store presently holding the original data) to be processed. In some embodiments, the deletion requests are held, e.g., in a queue, where a listener 112 may be implemented to monitor action requests inbound to the first data store for incoming deletion requests 114. The listener 112 may perform further processing on held deletion requests, prior to finally authorizing the deletion requests for final disposition by, e.g., the first data store 104.

The listener 112 may be any resource or collection of computing resources, such as that of a computing resource service provider, that is/are capable of processing data and communicating with other computing entities, such as by monitoring action requests inbound from the deleter 110 to the first data store 104. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data stores 104, 106 via application programming interface calls, web service calls, or other programmatic methods), and the like. In some embodiments, the deleter 110 may be implemented on one or more processes, daemons, and/or execution threads running on the resource or collection of computing resources. As an example, the deleter 110 may be one or more processes operating on the first data store 104.

In some embodiments, the listener 112 may ascertain, as a final check, several aspects of the incoming deletion request 114 prior to approving it for final execution by the first data store 104. For example, the listener 114 may compare the origin of the deletion request 114, and in some embodiments, a manifest of the verification checks and other actions performed in connection with the deletion request 114 (as well as the entities, e.g., auditor 108, deleter 110, that performed such actions), against a database or list of authorized issuers, actions, and the like. The database or list of authorized issuers, actions, etc., may be selected by the implementing system or some resource thereof (e.g., the listener 112) in accordance with one or more policies implemented by the system.

If the listener 112 determines that the deletion request 114 is valid according to these policies or other criteria, and the deletion request 114 has been authorized by all of the entities processing the deletion request 114 (e.g., the listener 112, the deleter 110, and the auditor 108), the listener 112 may provide a final approval for the deletion request 114, and thereon mark or submit the approved deletion request 114 for final disposition, e.g., by causing the first data store 104 to delete the original data 102 at issue in the deletion request.

Figure 2:
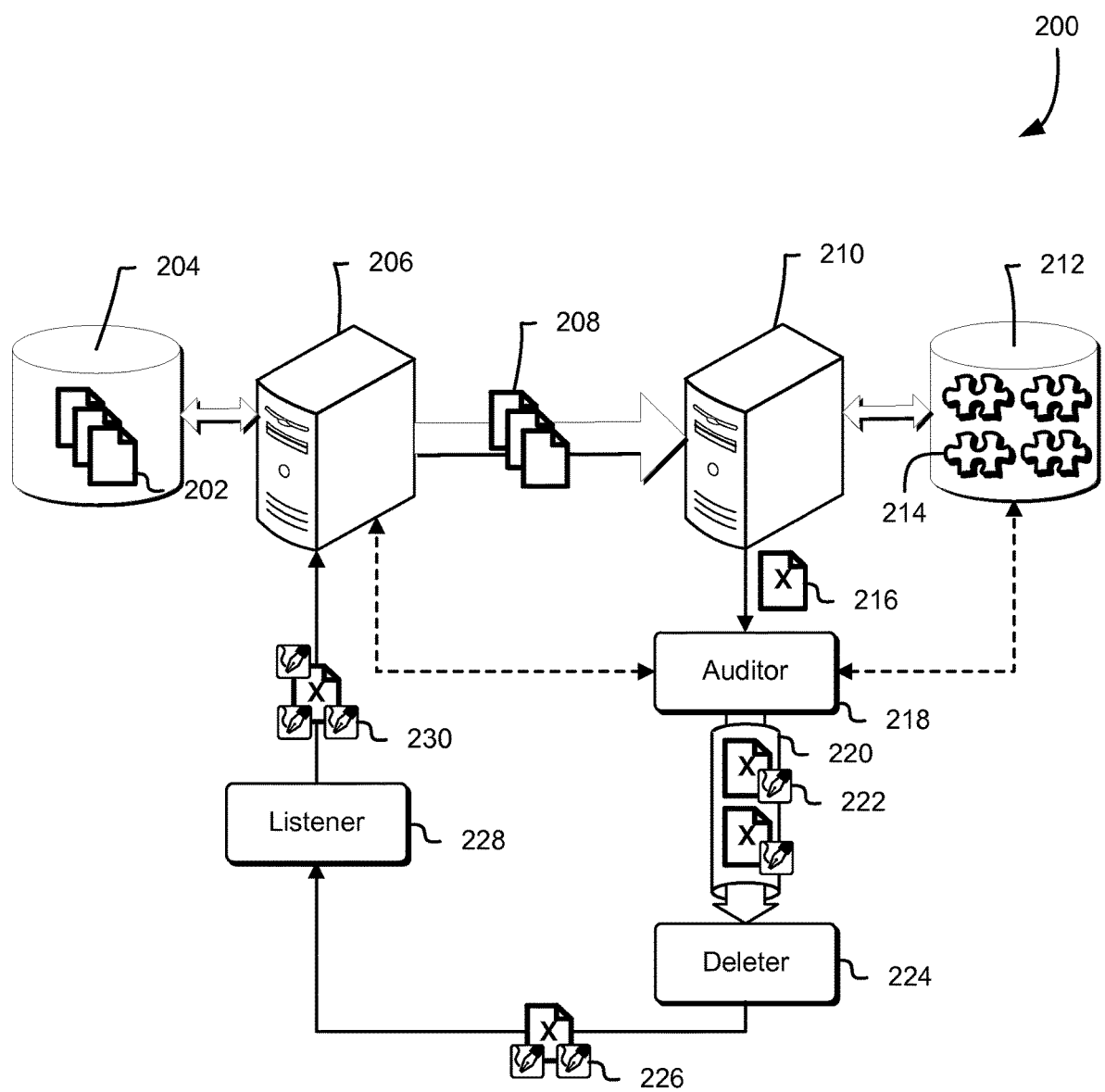
FIG. 2 schematically illustrates an example environment and various workflows for implementing an auditor, a listener, and a deleter for processing deletion requests of data, in accordance with some embodiments.

FIG. 2 schematically illustrates an example environment and various workflows for implementing an auditor, a listener, and a deleter for processing deletion requests of data, in accordance with some embodiments. Original data 202 is held on a first data store 202, which may include or be in communication with a first data storage system 206. The original data 202 may be subject to a migration workflow 208 that moves (or otherwise migrates) the original data 202 to a second data store 212, which may include or be in communication a second data storage system 210. As part of the migration workflow 208, the original data 204 may be processed, e.g., by the second data storage system, to generate a data set 214 that corresponds to the original data 204. In some embodiments, the data set 214 may be the original data 204. In some embodiments, the data set 214 may be derived from the original data 204, and restorable, through a reconstruction process, to generate a copy of the original data 204. In some of such embodiments, an entity, such as the second data storage server 210, may apply a redundancy code, such as an erasure code, to the original data 204 and generate a data set 214 including a plurality of shards, a subset of which is all that is necessary to reconstruct a copy of the original data 204. Also as part of the migration workflow 208, one or more deletion requests 216 may be issued by, e.g., the second data storage server 210, so as to be processed by at least an auditor 218.

The data storage servers 206, 210 may be any computing resource or collection of such resources capable of processing data for storage, and interfacing with one or more resources of the data stores 204, 212 to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage servers 204, 212 via application programming interface calls, web service calls, or other programmatic methods), and the like.

In some embodiments, the resources of the data storage servers 206, 210 as well as those of the data stores 204, 212, may be or include one or more resources of a computing resource service provider, such as that described in further detail below. In some embodiments, the data storage servers 204, 212 and/or the computing resource service provider provides one or more archival storage services and/or data storage services, such as those described in further below, through which the customers of the computing resource service provider may transact data such as data in connection with data storage requests and/or migration workflow requests directly, or indirectly, initiated by such customers.

As previously discussed, in connection with the migration workflow 208, the original data 202 is migrated, via storage servers 206 and 210, from a first data store 204 to a second data store 212. As an example, the migration workflow 208 may be performed as the result of a request of, e.g., a customer of an implementing computing resource provider, that provides the original data to the implementing system (e.g., including at least the first and second data stores) via a user interface or programmatic interface, such as an application programming interface call or a web service call. In some embodiments, incident to the migration workflow 208, one or more verifications and confirmations may be performed in connection with the deletion request 216 for original data from the first data store, so as to ensure the integrity of the original data 204 represented on the second data store 212 prior to removing the actual original data 204 on the first data store 204. In some embodiments, the verifications and confirmations performed in connection with the deletion request 216 may be apportioned to multiple entities and in any appropriate order. As previously mentioned, such entities may include an auditor 218, a deleter 224, and/or a listener 228, each of which may not fully trust any of the other entities. As a result, in some embodiments, a given deletion request 216 may only be fulfilled if all (or at least a predetermined quorum) of the entities involved in the verification process individually provide authorization to execute the deletion request (see, e.g., 230).

Any of the functionality of the auditor 218, the deleter 224, and/or the listener 228 described herein may be apportioned differently than described and remain within scope of the present disclosure. In some embodiments, some of the actions performed by the auditor 218, the deleter 224, and/or the listener 228 may be performed manually, such as by notifying, e.g., a customer, to provide input or confirmation relating to some of the responsibilities of the relevant entity. The functionality of the auditor 218, the deleter 224, and/or the listener 228 may be implemented using any combination of entities capable of performing, verifying, and/or confirming the actions described. In some embodiments, the functionality of the auditor 218, the deleter 224, and/or the listener 228, and/or the entities themselves, may be performed and/or under control of any combination of other entities. For example, a customer of a computing resource service provider may implement and/or control the auditor 218, while the deleter 224 and/or the listener 228 may be implemented and/or controlled by the computing resource service provider itself. As another example, the computing resource service provider may provide the functionality and/or the implementation of the auditor 218, while a customer of the computing resource service provider may implement at least the deleter 224 (and in some embodiments, the listener 228).

The deletion request 216 may include any data or metadata sufficient to identify the original data 202 to be deleted, as well as any other data necessary for the various entities processing the deletion request 216 to initiate and/or fulfill their specific duties. For example, the deletion request 216 may provide some form of authorization, such as a digital signature or other authorization information, that indicates the source and/or provenance of the deletion request 216 (e.g., initiated as a result of an identified migration workflow 208, initiated by the second data storage server 210, and the like).

In some embodiments, the deletion request 216, generated in connection with the migration workflow 208 and initiated, for example, by the second data storage server 210, is first sent to the auditor 218 to initiate a deletion workflow in connection with the deletion request 216. At the outset of the deletion workflow, the auditor 218 may perform various verification checks on the data set associated with the original data 204 requested to be deleted.

As previously discussed, the verification checks performed by the auditor 218 may be varied in quantity and in nature, and may be performed directly by the auditor 218, and/or, in some embodiments, may be initiated by the auditor 218 so as to be performed by a different entity, such as a component of the second data store 212 and/or the second data storage server 210. The verification checks may include verifying the data set 212 stored on the second data store 212 against the original data 202 (as stored on the first data store 204), and/or whether the data set 214 was even stored on the second data store 212 at all.

As previously mentioned, in some embodiments, the data set 212 may include a plurality of encoded shards that were derived, e.g., by the second data store 210 as part of the data migration 208 or storage process, by applying a redundancy code (e.g., erasure code) to the original data 202. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied.

In embodiments where the data set includes shards associated with the original data 202, the shards in the data set 212 may be used to reconstruct information from the data set 212, such as by inverting the previously applied redundancy coding matrix, or by generating a checksum or applying a hash function thereto. Further, in such embodiments, verification of the stored data set 212 may be executed by comparing the reconstructed information with analogous information related to the original data 202 as stored on the first data store 204. For example, the reconstructed information may be directly compared to the original data 202 so as to ascertain that they are the same. As another example, the reconstructed information may be compared to a function or value associated with the original data 202, such as a hash value (e.g., as derived from a hash function applied to the original data 202 as well as any reconstructed information) or a checksum, so as to ascertain that they match.

Other verification checks are contemplated hereby, and may include verification of whether metadata associated with the data set stored on the second data store 212 is the same as or complimentary to analogous metadata associated with the original data 202 as stored on the first data store 204. For example, in embodiments where the data set stored on the second data store 212 is sharded, the shards in the data set may be checked against one another for metadata consistency, and once the metadata consistency is confirmed across the shards, the metadata is checked against analogous metadata reported by, or connected to, the original data 104 stored on the first data store 104. Such metadata be any metadata incident to the original data, and may identify either the original data or various aspects of the data set. For example, the metadata may include an identifier for the original data, an identifier for a customer associated with the original data, various integrity information (e.g., hash values, checksums, digital signatures), references to related data sets (e.g., if the original data 202 or the data set 214 is part of a group of other original data or data sets 214), and the like.

In some embodiments where the data set 214 includes redundancy coded shards derived from the original data 202, a verification check that may be executed is to calculate the number of shards in the data set 214 stored on the second data store 212, and compare that quantity relative to a predetermined value that may, for example, be selected from a policy implemented by the implemented data storage server 210, the second data store 212, the auditor 218, or other entity associated with the computing resource service provider. For example, the data set 214 may be generated such that n shards are expected to be stored, but the auditor 218 may consider the data set 214 to be properly stored on the second data store 212 if n–x (or n+x) shards actually exist in the stored data set 214, where n–x (or n+x) may be the predetermined value.

To the extent that any of the verification checks performed by the auditor fail, the deletion request 216 is suspended, and in some embodiments, a mitigation workflow may be initiated. The mitigation workflow may be any workflow, whether automated, manual, or some combination, to identify and/or remedy the cause of the failure of the verification checks. As part of the mitigation workflow, an entity, such as the second data storage server 210, may be notified. In some embodiments, after the mitigation workflow is completed (e.g., by the second data storage server 210 and/or the second data store 212), the associated deletion request 216 may be resubmitted, e.g., to the auditor.

After successfully performing the verification checks, the auditor 218 may approve the deletion request, such as by including authorization information (e.g., 222) (e.g., a digital signature) with the deletion request, and place it in a queue 220 for further processing by a deleter 224. The queue 222 may be any computing resource or collection of computing resources, such as that of an implementing computing resource service provider, that is capable of temporarily storing data, such as data associated with incoming deletion requests, and providing the stored data to a different computing entity (such as the deleter 224) in a specified order. For example, the queue 222 may be one or more buffers allocated in the memory of either the auditor 218 or the deleter 224, or other resource(s) of an implementing computing resource service provider. As another example, the queue 222 may be provided by a service of the computing resource service provider, using one or more resources associated therewith. As another example, the specified order may be provided by, e.g., the auditor 218, the deleter 224, or the service implementing the queue 220, in connection with an optimal order for processing by the deleter 224. As yet another example, the specified order may be a first-in, first-out order, in which the queue 224 acts as a buffer to smooth out peaks in the rate at which the deletion requests 222 are transmitted by the auditor 218.

At a time after dequeuing a given deletion request 222 from the queue 220, the deleter 224 may first determine whether the auditor 218 performed at least a predetermined set of verification checks required by the implementing system as a prerequisite for approving a given deletion request, as well as assess the outcome of at least that predetermined set of verification checks as performed by the auditor 218. For example, the deleter 224 may require a first set of verification checks to have been completed, while the auditor 218 may have performed a second set of verification checks. To the extent that the first set of verification checks is coincident with, or a subset of, the second set of verification checks, and those checks the deleter 224 requires had successful outcomes (as determined by the auditor 218 or the deleter 224), the deleter 224 may further issue the deletion request for the associated original data to the first data store 204. In some of such embodiments, the deleter 224 may sign the deletion request in a fashion similar to that described above in connection with the auditor 218. In some embodiments, the signatures of the auditor 218 and the deleter 224 may both be attached to the deletion request prior to it being submitted to the first data storage server 206 (see, e.g., 226). To the extent that the checks performed by the deleter 224 fail, however, the deletion request may be suspended or aborted, and the aforementioned mitigation workflow may be initiated.

In some embodiments, the deleter 224 may assess the raw data generated by the verification checks performed or initiated by the auditor 218, and make verification determinations from that raw data that are independent of the auditor's 108 assessment of the same raw data. In such cases, as may be contemplated, the verification checks performed may have provided results that fulfill the independent requirements of both the auditor 218 and the deleter 224 in order for an associated deletion request 222 to be passed on to the first data storage server 206 for further disposition.

Once the aforementioned requirements are met, the deleter 224 may further approve and issue the deletion request 226 to the first data storage server 206 to be processed. In some embodiments, the deletion requests are held, e.g., in a queue similar to the queue 220, where a listener 228 may be implemented to monitor and/or intercept action requests inbound to the first data storage server 206 for incoming deletion requests similar to the deletion request 226. The listener 228 may perform further processing on held deletion requests, prior to finally authorizing the deletion requests for final disposition by, e.g., the first data storage server 206.

As previously discussed, in some embodiments, the listener 228 may ascertain, as a final check, several aspects of the incoming deletion request 226 prior to approving it for final execution by the first data storage server 206. For example, the listener 228 may compare the origin of the deletion request 226 (such as may be included in the deletion request 226, as previously discussed), and in some embodiments, a manifest of the verification checks and other actions performed in connection with the deletion request 226 (as well as the entities, e.g., auditor 218, deleter 224, that were involved in such actions), against a database or list of authorized issuers, actions, and the like. The database or list of authorized issuers, actions, etc., may be selected by the implementing system or some resource thereof (e.g., the listener 228) in accordance with one or more policies implemented by the system, and may be stored, whether permanently or temporarily, in memory that is in communication with the listener 228.

If the listener 228 determines that the deletion request 226 is valid according to these policies or other criteria, and the deletion request 226 has been authorized by all of the entities processing the deletion request 226 (e.g., the listener 228, the deleter 224, and the auditor 218), the listener 228 may provide a final approval for the deletion request 226, and thereon mark or submit the approved deletion request 228 for final disposition, e.g., by causing the first data storage server 206 to delete the original data 202 at issue in the deletion request from the first data store 204. The listener 228 may provide such approval in a fashion similar to that of the auditor 218 and the deleter 224, e.g., by independently executing the verifications mentioned, and/or by adding a digital signature or other authorization information to the deletion request prior to submitting it to the data storage server 206 for disposition (see, e.g., 230). The data storage server 206 may be configured to execute an incoming deletion request 230 only if all entities involved in the verification process have provided assent or authorization, e.g., by checking to see whether appropriate signatures for at least the auditor 218 and the deleter 224 are attached to the incoming deletion request. In some embodiments, the listener 228 may provide this function, rather than some other resource of the data storage server 206.

Figure 3:
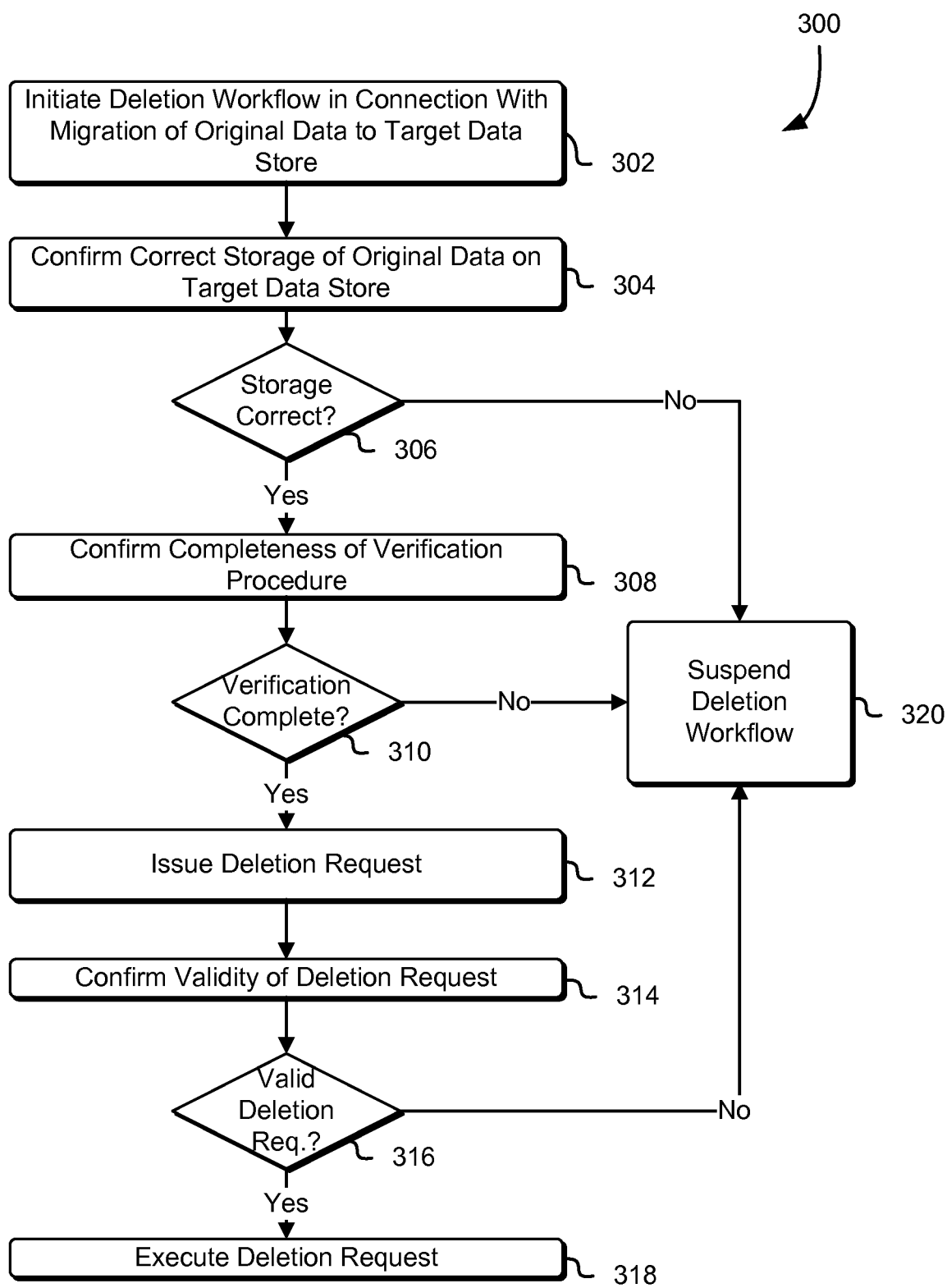
FIG. 3 schematically illustrates an example process for verifying deletion requests connected to original data migration, in accordance with some embodiments.

FIG. 3 schematically illustrates an example process for verifying deletion requests connected to original data migration, in accordance with some embodiments. At step 302, a deletion workflow is initiated, such as by a data storage server or a data store as described above in connection with at least FIGS. 1 and 2, in connection with a migration of original data from a first data store to a second data store. The deletion workflow may be initiated synchronously with some event in the migration workflow, or kicked off asynchronously at some point after the migration workflow has been initiated or apparently completed.

At step 304, an entity, such as an auditor as discussed above in connection with at least FIGS. 1 and 2, first confirms, using various techniques discussed in more detail above in connection with FIGS. 1 and 2, whether the original data is correctly represented on the second (target) data store. At decision point 306, if the entity (e.g., auditor) determines that the original data was correctly migrated to the second data store, at step 308, a second entity, such as a deleter as described above in connection with at least FIGS. 1 and 2, independently confirms the completeness and/or veracity of the verification procedure used in connection with step 304.

At decision point 310, if the second entity determines that the verification procedure used in step 304 was appropriate, at step 312, a deletion request is submitted, e.g., by the deleter, to the first data store holding the original data. At step 314, a third entity, such as a listener described above in connection with at least FIGS. 1 and 2, confirms the validity of the deletion request, such as by ascertaining the provenance and/or process used to justify the deletion request, e.g., in connection with steps 304 and 308. At decision point 316, if the deletion request is deemed valid, the deletion request is executed at step 318 and the original data evicted from the first data store.

To the extent that any of the verification steps 304, 308, and 312 fail, e.g., at decision points 306, 310 and 316, the deletion workflow is suspended at step 320. As previously discussed, the suspension of the deletion workflow may be caused by any of the three entities involved in verification, and one or more of such entities may initiate a mitigation workflow, such as described above, to identify and remedy the cause of the verification failure. In some embodiments, after the failures are addressed, the deletion request may be resubmitted or resumed.

Figure 4:
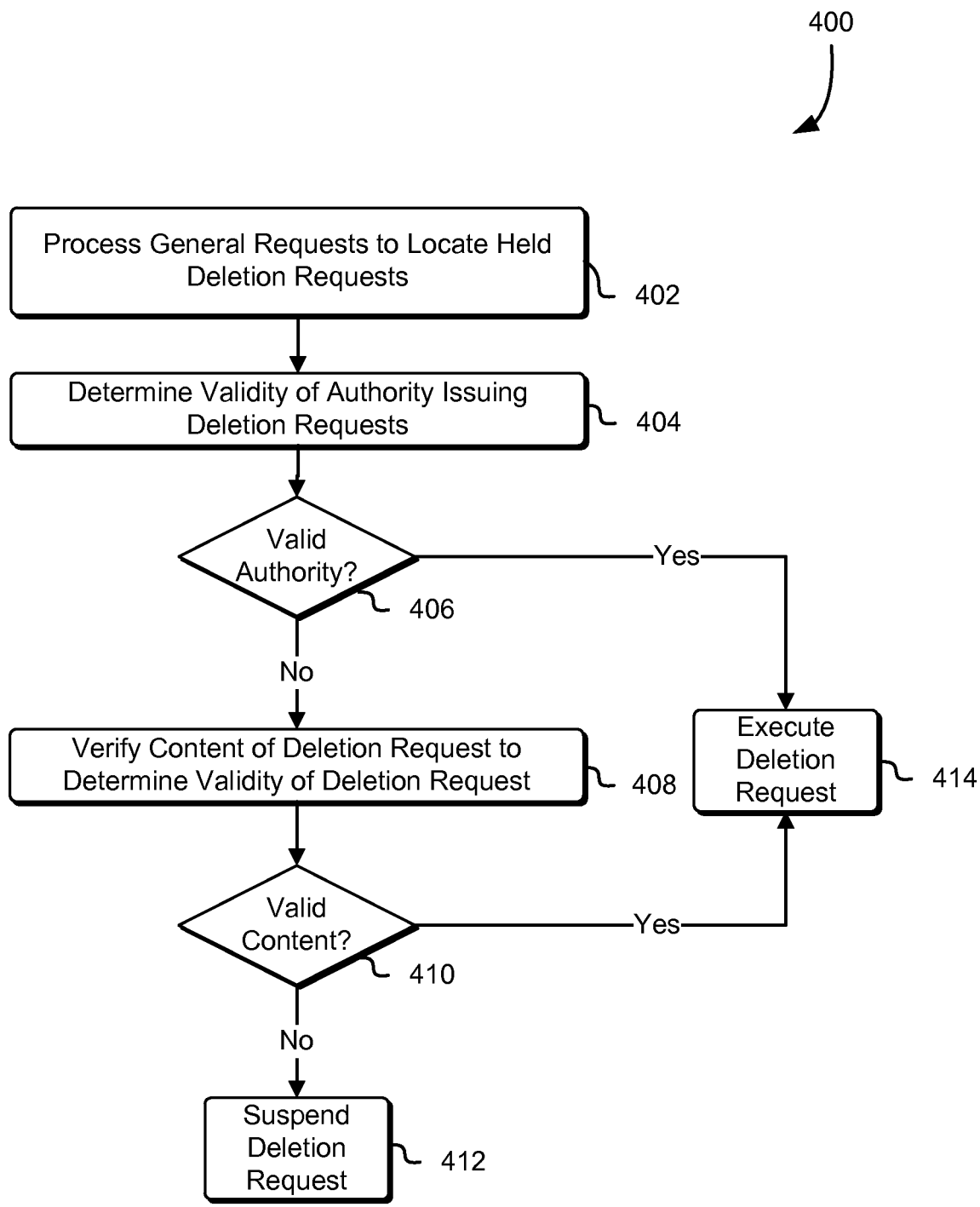
FIG. 4 schematically illustrates an example process for verifying authorization and content of incoming deletion requests, in accordance with some embodiments.

FIG. 4 schematically illustrates an example process for verifying authorization and content of incoming deletion requests, in accordance with some embodiments. At step 402, an entity, such as a listener as described above in connection with at least FIGS. 1 through 3, processes a plurality of general requests to identify and locate inbound deletion requests. As previously discussed, the listener may be separate from a data store holding data to be deleted, or may be a component of the data store.

At step 404, the entity (e.g., listener) determines the validity of the authority issuing the deletion requests. For example, as previously discussed, the entity may compare the identity of the issuing authority to a predetermined list or database of authorities authorized to issue actionable deletion requests. At decision point 406, if the authority is deemed invalid, or is missing from the deletion requests, further verifications are performed at step 408 to further assess the content of the inbound deletion request and determine whether the deletion request is authorized and valid. For example, the listener may assess the verification information (e.g., digital signatures) attached to the deletion requests, as well as independently verify the actions taken to verify the deletion requests by other entities, such as an auditor and/or a deleter as previously described.

If, at decision point 410, the entity determines that the content of the deletion request does not comport to its requirements, the deletion request is suspended 412 and, in some embodiments, a mitigation workflow such as that previously described is initiated. However, to the extent that identified issuing authority is valid (at decision point 406) and/or the content of the deletion request is otherwise valid (at decision point 410), the deletion request is executed at step 414, such as by the data store holding the associated original data, and the original data is thereon evicted from the data store.

Figure 5:
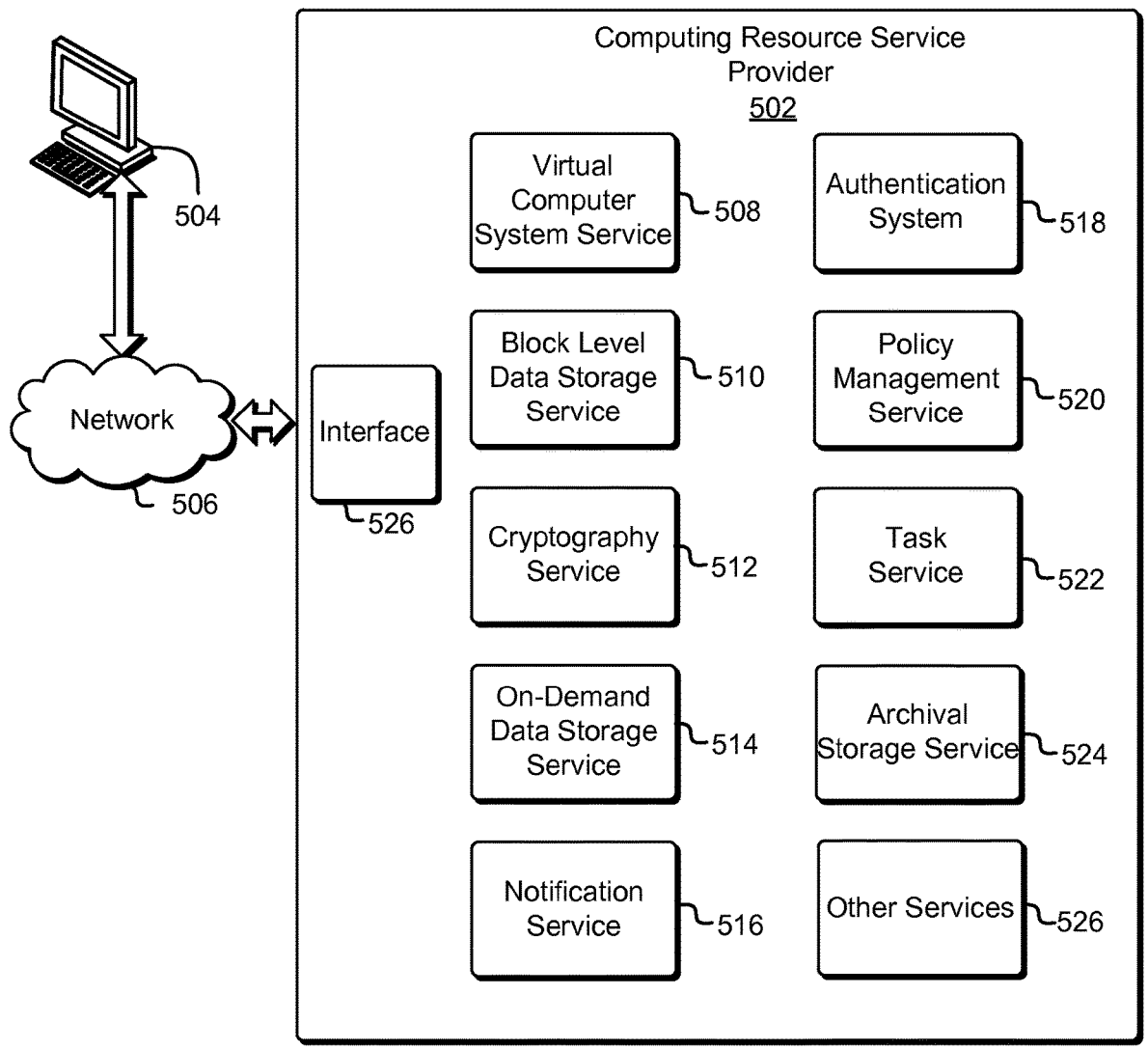
FIG. 5 shows an example of a customer connected to a computing resource service provider in accordance with at least one embodiment.

FIG. 5 shows an example of a customer connected to a computing resource service provider in accordance with at least one embodiment. The computing resource service provider 502 may provide a variety of services to the customer 504 and the customer 504 may communicate with the computing resource service provider 502 via an interface 526, which may be a web services interface or any other type of customer interface. While FIG. 5 shows one interface 526 for the services of the computing resource service provider 502, each service may have its own interface and, generally, subsets of the services may have corresponding interfaces in addition to or as an alternative to the interface 526. The customer 504 may be an organization that may utilize one or more of the services provided by the computing resource service provider 502 to maintain and deliver information to its employees, which may be located in various geographical locations. Additionally, the customer 504 may be an individual that utilizes the services of the computing resource service provider 502 to deliver content to a working group located remotely. As shown in FIG. 5, the customer 504 may communicate with the computing resource service provider 502 through a network 506, whereby the network 506 may be a communication network, such as the Internet, an intranet or an Internet service provider (ISP) network. Some communications from the customer 504 to the computing resource service provider 502 may cause the computing resource service provider 502 to operate in accordance with one or more embodiments described or a variation thereof.

The computing resource service provider 502 may provide various computing resource services to its customers. The services provided by the computing resource service provider 502, in this example, include a virtual computer system service 508, a block-level data storage service 510, a cryptography service 512, an on-demand data storage service 514, a notification service 516, an authentication system 518, a policy management service 520, a task service 522 and one or more other services 524. It is noted that not all embodiments described include the services 508-524 described with reference to FIG. 5 and additional services may be provided in addition to or as an alternative to services explicitly described. As described, each of the services 508-524 may include one or more web service interfaces that enable the customer 504 to submit appropriately configured API calls to the various services through web service requests. In addition, each of the services may include one or more service interfaces that enable the services to access each other (e.g., to enable a virtual computer system of the virtual computer system service 508 to store data in or retrieve data from the on-demand data storage service 514 and/or to access one or more block-level data storage devices provided by the block level data storage service 510).

The virtual computer system service 508 may be a collection of computing resources configured to instantiate virtual machine instances on behalf of the customer 504. The customer 504 may interact with the virtual computer system service 508 (via appropriately configured and authenticated API calls) to provision and operate virtual computer systems that are instantiated on physical computing devices hosted and operated by the computing resource service provider 502. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 508 is shown in FIG. 5, any other computer system or computer system service may be utilized in the computing resource service provider 502, such as a computer system or computer system service that does not employ virtualization or instantiation and instead provisions computing resources on dedicated or shared computers/servers and/or other physical devices.

The block-level data storage service 510 may comprise one or more computing resources that collectively operate to store data for a customer 504 using block-level storage devices (and/or virtualizations thereof). The block-level storage devices of the block-level data storage service 510 may, for instance, be operationally attached to virtual computer systems provided by the virtual computer system service 508 to serve as logical units (e.g., virtual drives) for the computer systems. A block-level storage device may enable the persistent storage of data used/generated by a corresponding virtual computer system where the virtual computer system service 508 may only provide ephemeral data storage.

The computing resource service provider 502 also includes a cryptography service 512. The cryptography service 512 may utilize one or more storage services of the computing resource service provider 502 to store keys of the customers in encrypted form, whereby the keys may be usable to decrypt customer 512 keys accessible only to particular devices of the cryptography service 512.

The computing resource service provider 502 further includes an on-demand data storage service 514. The on-demand data storage service 514 may be a collection of computing resources configured to synchronously process requests to store and/or access data. The on-demand data storage service 514 may operate using computing resources (e.g., databases) that enable the on-demand data storage service 514 to locate and retrieve data quickly, to allow data to be provided in responses to requests for the data. For example, the on-demand data storage service 514 may maintain stored data in a manner such that, when a request for a data object is retrieved, the data object can be provided (or streaming of the data object can be initiated) in a response to the request. As noted, data stored in the on-demand data storage service 514 may be organized into data objects. The data objects may have arbitrary sizes except, perhaps, for certain constraints on size. Thus, the on-demand data storage service 514 may store numerous data objects of varying sizes. The on-demand data storage service 514 may operate as a key value store that associates data objects with identifiers of the data objects that may be used by the customer 504 to retrieve or perform other operations in connection with the data objects stored by the on-demand data storage service 514.

In the environment illustrated in FIG. 5, a notification service 516 is included. The notification service 516 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 516 may provide notifications to clients using a "push" mechanism without the need to check periodically or "poll" for new information and updates. The notification service 516 may further be used for various purposes such as monitoring applications executing in the virtual computer system service 508, workflow systems, time-sensitive information updates, mobile applications, and many others.

As illustrated in FIG. 5, the computing resource service provider 502, in various embodiments, includes an authentication system 518 and a policy management service 520. The authentication system 518, in an embodiment, is a computer system (i.e., collection of computing resources) configured to perform operations involved in authentication of users of the customer. For instance, one of the services 508-516 and 520-524 may provide information from a user to the authentication system 518 to receive information in return that indicates whether the user requests are authentic.

The policy management service 520, in an embodiment, is a computer system configured to manage policies on behalf of customers (such as customer 504) of the computing resource service provider 502. The policy management service 520 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 502, in various embodiments, is also equipped with a task service 522. The task service 522 is configured to receive a task package from the customer 504 and enable executing tasks as dictated by the task package. The task service 522 may be configured to use any resource of the computing resource service provider 502, such as one or more instantiated virtual machines or virtual hosts, for executing the task. The task service 524 may configure the one or more instantiated virtual machines or virtual hosts to operate using a selected operating system and/or a selected execution application in accordance with a requirement of the customer 504.

The computing resource service provider 502 further includes an archival storage service 524. The archival storage service 524 may comprise a collection of computing resources that collectively operate to provide storage for data archiving and backup of customer data. The data may comprise one or more data files that may be combined to form an archive. The archival storage service 524 may be configured to persistently store data that may be infrequently accessed and for which long retrieval times are acceptable to a customer utilizing the archival storage service 524. A customer may interact with the archival storage service 524 (for example, through appropriately configured API calls made to the archival storage service 524) to generate one or more archives, upload and retrieve the one or more archives or monitor the generation, upload or retrieval of the one or more archives.

The computing resource service provider 502 additionally maintains one or more other services 526 based at least in part on the needs of its customers 504. For instance, the computing resource service provider 502 may maintain a database service for its customers 504. A database service may be a collection of computing resources that collectively operate to run one or more databases for one or more customers 504. The customer 504 may operate and manage a database from the database service by utilizing appropriately configured API calls. This, in turn, may allow a customer 504 to maintain and potentially scale the operations in the database. Other services include, but are not limited to, object-level archival data storage services, services that manage and/or monitor other services.

As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Figure 6:
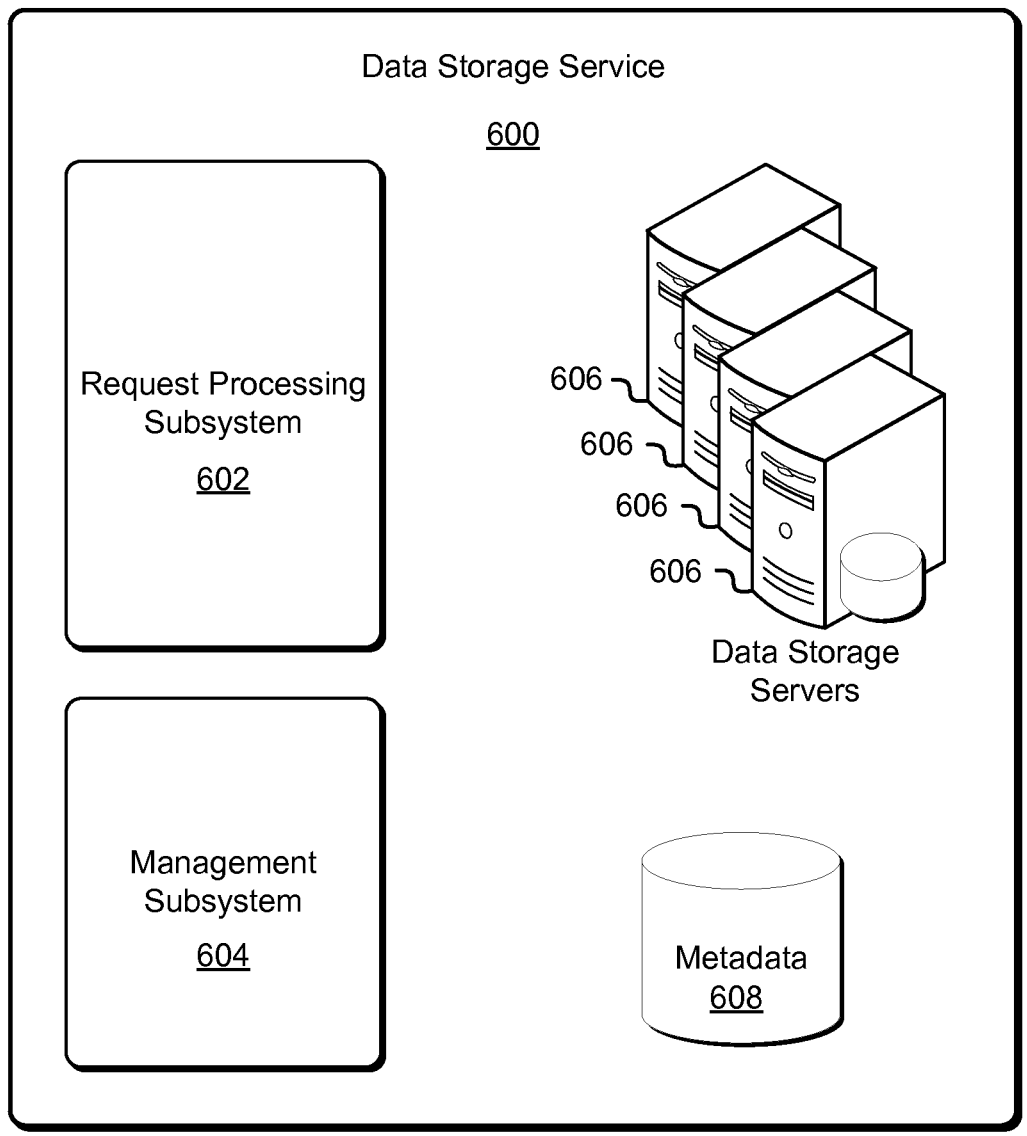
FIG. 6 shows an illustrative example of a data storage service in accordance with various embodiments.

FIG. 6 shows an illustrative example of a data storage service in accordance with various embodiments. The data storage service 600 may be a service of a computing resource service provider used to operate an on-demand data storage service such as described above in connection with FIG. 5. As illustrated in FIG. 6, the data storage service 600 includes various subsystems such as a request processing subsystem 602 and a management subsystem 604. The data storage service 600 may also include a plurality of data storage servers 606 and a metadata storage 608, which may store metadata about various data objects stored among the data storage servers 606 as described. In an embodiment, the request processing subsystem 602 is a collection of computing resources, such as webservers and application servers, collectively configured to process requests submitted to the data storage service 600. The request processing subsystem 602, for example, may include one or more webservers that provide a web service interface to enable customers of the data storage service 600 to submit requests to be processed by the data storage service 600. The request processing subsystem 602 may include computers systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 600 (e.g., through network communications). For example, some requests submitted to the request processing subsystem 602 may involve the management of computing resources which may include data objects stored by the data storage servers 606. The request processing subsystem 602, for example, may receive and process requests to modify computing resources. For instance, in some examples, data objects are logically organized into logical data containers. Data objects associated with a logical data container may, for example, be said to be in the logical data container. Requests to the data processing subsystem 602 may include requests for creating logical data containers, deleting logical data containers, providing an inventory of a logical data container, providing or updating access control policy with respect to one or more logical data containers and the like.

The requests may be processed by the management subsystem 604 upon receipt by the request processing subsystem 602. If applicable, various requests processed by the request processing subsystem 602 and/or management subsystem 604, may result in the management subsystem 604 updating metadata associated with data objects and logical data containers stored in the metadata store 608. Other requests that may be processed by the request processing subsystem 602 include requests to perform operations in connection with data objects. The requests, for example, may include requests to upload data objects to the data storage service 600, to download data objects from the data storage service 600, to delete data objects stored by the data storage service 600 and/or other operations that may be performed.

Requests processed by the request processing subsystem 602 that involve operations on data objects (upload, download, delete, e.g.) may include interaction between the request processing subsystem 602 and one or more data storage servers 606. The data storage servers 606 may be computer system communicatively coupled with one or more storage devices for the persistent of data objects. For example, in order to process a request to upload a data object, the request processing subsystem may transmit data to a data storage server 606 for persistent storage. It is noted, however, that in some embodiments, client (e.g., customer) computer systems may transmit data directly to the data storage servers 606 instead of through severs in the request processing subsystem.

In some embodiments, the request processing subsystem 602 transmits data to multiple data storage servers 606 for the purposes of redundantly storing the data to allow the retrievability of data in the event of failure of an individual data storage server 606 and/or associated data storage device. For example, in some embodiments, the request processing subsystem uses a redundancy in coding scheme such as erasure coding to deconstruct a data object into multiple parts that are stored among the data storage servers 606. The parts may be configured such that if access to a certain number of parts is lost, the data object may nevertheless be reconstructible from the remaining parts that remain accessible.

To enable efficient transfer of data between the request processing subsystem 602 and the data storage servers 606 and/or generally to enable quick processing of requests, the request processing subsystem 602 may include one or more databases that enable the location of data among the data storage servers 606. For example, the request processing subsystem 602 may operate a key value store that serves to associate identifiers of data objects with locations among the data storage servers 606 for accessing data of the data objects.

Figure 7:
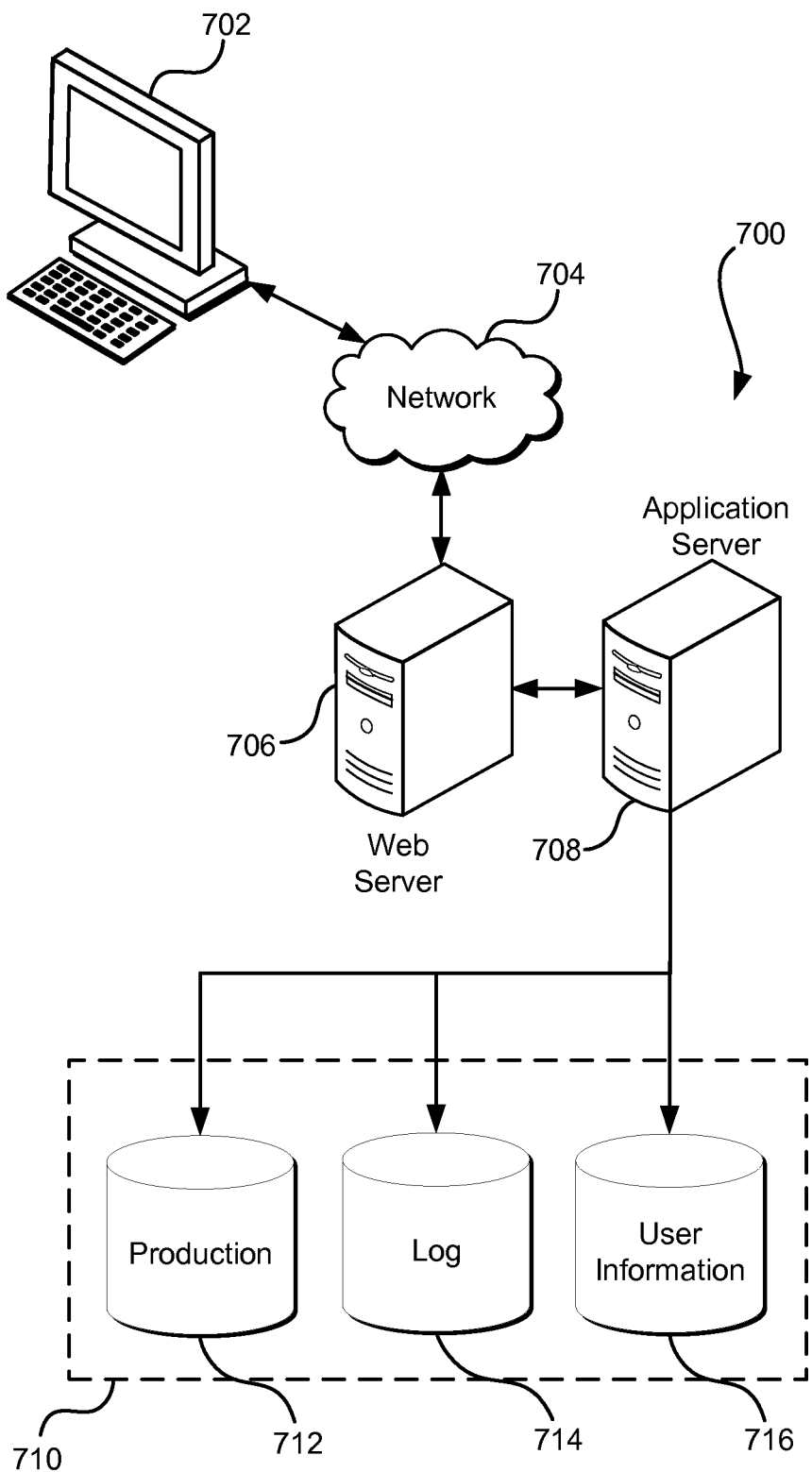
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
in connection with storing, on a second data store, original data residing on a first data store, processing the deletion of the original data on the first data store by at least:
causing an auditor to verify, by one or more verification checks, whether one or more shards on the second data store correctly reflect the original data;
as a result of the auditor verifying that the one or more shards correctly reflect the original data, causing the auditor to place a deletion request for the original data in a queue that includes a first authentication information associated with the auditor;
causing a deleter to process the deletion request by:
causing the deleter to select the deletion request from the queue; and causing the deleter to verify performance, by the auditor, of at least a subset of the verification checks;

as a result of the deleter verifying that the auditor performed the subset of the verification checks, causing the deleter to include a second authentication information associated with the deleter to the deletion request and issue the deletion request to the first data store;

at a time after a listener detects the deletion request issued to the first data store, causing the listener to verify validity of the deletion request by at least verifying validity of the first authentication information and the second authentication information; and as a result of the listener verifying that the deletion request is valid, causing the first data store to execute the deletion request for the original data by at least including a third authentication information associated with the listener to the delete request.

2. The computer-implemented method of claim 1, wherein the one or more shards are redundancy coded shards derived, by the second data store, from the original data.

3. The computer-implemented method of claim 1, wherein the one or more verification checks includes deriving a first set of verification information from the one or more shards and comparing the first set of verification information to a second set of verification information derived from the original data.

4. The computer-implemented method of claim 1, wherein the listener detects the deletion request from a plurality of action requests issued to the first data store.

5. A system, comprising:
at least one computing device configured to implement one or more services, wherein the one or more services are configured to:
verify a deletion request of original data stored on a first data store by:
determining, by executing one or more verification checks whether a data set that accurately represents the original data is stored on a second data store;
determining whether at least a subset of the one or more verification checks was properly executed; and
determining whether the deletion request is authorized by a plurality of computing entities processing the deletion request by:
verifying validity of a first digital signature of a first computing entity of the plurality indicating approval of the delete request and verifying validity of second digital signature of a second entity of the plurality indicating approval of the delete request; and
in response to verifying validity of the first digital signature and second digital signature, providing a third digital signature associated with a third computing entity of the plurality indicating approval of the delete request; and
as a result of determining that the data set accurately represents the original data, determining that the subset of the one or more verification checks was properly executed, and determining that the deletion request is authorized by the plurality of computing entities by verifying validity of at least the third digital signature, delete the original data from the first data store.

6. The system of claim 5, wherein the one or more services are further configured to cause an auditor to execute the one or more verification checks.

7. The system of claim 6, wherein the one or more services are further configured to cause a deleter to determine whether the subset of the one or more verification checks was properly executed, and wherein the deleter is a separate entity from the auditor.

8. The system of claim 5, wherein:
the one or more services are further configured to cause a listener communicatively connected to the first data store to verify validity of the first digital signature, of an auditor, indicating approval of the delete request and verify validity of the second digital signature, of a deleter, indicating approval of the delete request; and
wherein the determining that the deletion request is authorized by the plurality of computing entities comprises verifying validity of the first, second, and third digital signatures.

9. The system of claim 8, wherein the one or more services are further configured to cause the listener to poll the first data store for deletion requests among a plurality of action requests inbound to the first data store.

10. The system of claim 5, wherein the data set is a redundancy coded form of the original data.

11. The system of claim 10, wherein the one or more services are further configured to cause the second data store to apply a redundancy code to the original data to generate the data set.

12. The system of claim 5, wherein the one or more services are further configured to receive, by the first data store, the original data via an application programming interface.

13. A non-transitory computer-readable storage medium having stored thereon executable instructions that, when executed by one or more processors of a computer system, cause the computer system to at least:
process a migration of original data from a first data store to a second data store by:
causing a first entity of a plurality of computing entities to execute one or more verification checks to determine whether a data set that accurately represents the original data is stored on the second data store;
causing the first entity to provide a first digital signature of a plurality of digital signatures that collectively indicates approval of deletion by the plurality of computing entities, in response to the one or more verification checks passing;
causing a second entity of the plurality of computing entities that is separate from the first entity to verify the execution of the one or more verification checks; and
causing the second entity to provide a second digital signature of the plurality of digital signatures in response to verifying correct execution of the one or more verification checks;
as a result of determining that the data set accurately represents the original data and verifying that the one or more verification checks were executed, at least:
verify whether the original data is eligible to be deleted; and
as a result of verifying that the original data is eligible to be deleted and that deletion of the original data is authorized by the plurality of computing entities by at least verifying validity of the plurality of digital signatures, delete the original data from the first data store.

14. The non-transitory computer-readable storage medium of claim 13, wherein the instructions further comprise instructions that, when executed by the one or more processors, cause the computer system to process the migration of original data from the first data store to the second data store by causing the second data store to apply a redundancy code to the original data in connection with the migration.

15. The non-transitory computer-readable storage medium of claim 13, wherein the one or more verification checks, verify whether one or more redundancy coded shards on the second data store correctly reflect the original data.

16. The non-transitory computer-readable storage medium of claim 13, wherein the instructions further comprise instructions that, when executed by the one or more processors, cause the computer system to verify whether the original data is eligible to be deleted by at least comparing an identity of the second entity against a list of entities authorized to issue deletion requests to the first data store.

17. The non-transitory computer-readable storage medium of claim 13, wherein the data set comprises a plurality of erasure coded shards corresponding to the original data.

18. The non-transitory computer-readable storage medium of claim 17, wherein the instructions further comprise instructions that, when executed by the one or more processors, cause the computer system to execute the one or more verification checks by at least reconstructing information using every shard of the plurality of erasure coded shards and comparing the reconstructed information to the original data.

19. The non-transitory computer-readable storage medium of claim 17, wherein the instructions further comprise instructions that, when executed by the one or more processors, cause the computer system to execute the one or more verification checks by at least comparing a first quantity of erasure coded shards of the plurality of erasure coded shards to a second predetermined quantity.

20. The non-transitory computer-readable storage medium of claim 13, wherein the instructions further comprise instructions that, when executed by the one or more processors, cause the computer system to execute the one or more verification checks by at least comparing a first set of metadata associated with the data set and stored on the second data store with a second set of metadata associated with the original data and stored on the first data store.

* * * * *